United States Patent
Thomas

[11] 3,764,881
[45] Oct. 9, 1973

[54] TRANSFORMER-COUPLED POWER CONVERTER SAMPLING SYSTEM

[75] Inventor: Robert M. Thomas, Brockville, Ontario, Canada

[73] Assignee: GTE Automatic Electric Laboratories Incorporated, Northlake, Ill.

[22] Filed: June 29, 1972

[21] Appl. No.: 267,350

[52] U.S. Cl. .............................. 321/2, 323/DIG. 1
[51] Int. Cl. ........................................... H02m 3/32
[58] Field of Search .................. 307/297; 321/2, 18; 323/17, DIG. 1

[56] References Cited
UNITED STATES PATENTS

| | | | |
|---|---|---|---|
| 3,564,393 | 2/1971 | Williamson | 323/17 |
| 3,629,622 | 12/1971 | Denenberg | 323/DIG. 1 |
| 3,629,686 | 12/1971 | Hendrikus et al. | 323/DIG. 1 |
| 3,671,842 | 6/1972 | McKeown | 321/2 X |

*Primary Examiner*—A. D. Pellinen
*Attorney*—K. Mullerheim et al.

[57] ABSTRACT

A transformer coupled DC-DC converter wherein the regulation of the output voltage is achieved by sampling the voltage across the transformer primary winding during a particular interval of the cycle. This sampling is achieved by the use of a field effect transistor that is gated on at a time just prior to the time the transformer field collapses. This sample voltage is held by a charged capacitor and used to control a blocking oscillator.

6 Claims, 2 Drawing Figures

PATENTED OCT 9 1973          3,764,881

TRANSFORMER-COUPLED POWER CONVERTER SAMPLING SYSTEM

BACKGROUND OF THE INVENTION

1. Field of the Invention

This invention relates to regulated voltage electronic power converters for converting a first DC voltage to a second DC voltage. More specifically, the present invention relates to a control system within such converter, that is simpler and more economical to manufacture.

2. Description of the Prior Art

DC to DC converters are well known. Many types and variations are to be found in standard reference works. These commonly employ various vibrator circuits using silicon controlled rectifiers, transistors and other devices as switching elements in the initial conversion of the direct current to alternating current. In a second conversion the alternating current is rectified at a second potential. The second potential is obtained by the use of a transformer. Transformer-coupled converters are used whenever a voltage conversion and/or electrical isolation is required.

Regulation of the DC output voltage is achieved by sampling this voltage and feeding an error signal back to the oscillator or chopper to change its frequency and/or duty cycle. Power converters using this approach are in common use. An example of such a converter is that disclosed in U.S. Pat. No. 3,515,974 issued June 2, 1970.

When isolation must be maintained between the input and output, an isolating element must be inserted in the feedback path; this can consist of a controlled oscillator-transformer-rectifier combination as in the supplies mentioned above, or optical or other coupling can be used. In general, the necessity of providing this isolating element adds to the cost and complexity of the supply.

SUMMARY OF THE INVENTION

Accordingly, it is an object of the present invention to provide a converter circuit that does not require a second isolating element.

In accordance with the invention, the power transformer primary voltage is used to derive a model of the secondary voltage waveform, thus eliminating a second isolating element.

BRIEF DESCRIPTION OF THE DRAWING

These features and other advantages of this invention will be readily appreciated, as the same becomes better understood by reference to the following detailed description when considered in connection with the accompanying drawings.

DESCRIPTION OF THE PREFERRED EMBODIMENT

General:

The type of converter to which this invention has been applied uses a blocking-oscillator circuit to build up a magnetic field in the power transformer (FIG. 1); the blocking oscillator shuts off and the magnetic field in the transformer core collapses, causing secondary current to flow via the rectifier into the filter capacitor.

Figure 2:
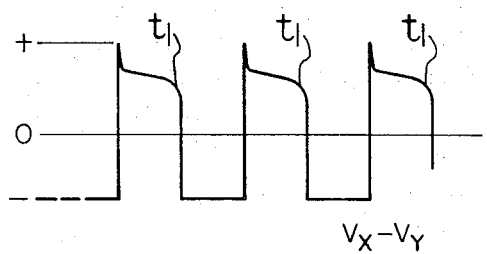
FIG. 2 depicts a waveform of the voltage across the primary winding of the transformer.

The primary voltage waveform is as shown in FIG. 2; during the "off" part of the blocking-oscillator cycle, the voltage induced in the primary is:

$$V_P = N1/N2 \ (V_{out} + V_D + V_{RS}) \tag{1}$$

where
 $N1$ = Primary Turns
 $N2$ = Secondary Turns
 $V_{out}$ = DC Output Voltage
 $V_D$ = Rectifier Forward Voltage
 $V_{RS}$ = Drop in Secondary Copper Resistance $V_D$ consists of a logarithmic function of secondary current plus a term $I_s R_D$, where $I_s$ is secondary current and $R_D$ is the diode bulk resistance. The logarithmic function may be closely approximated by a constant $V_{DO}$.

$V_{RS}$ is simply equal to $I_s, R_s$ where $R_s$ is the secondary copper resistance.

From (1), $V_P = N1/N2 \ (V_{out} + V_{DO} + I_s R_D + I_s R_s)$

At time $t_1$, $I_s$ is small, so $V_P = N1/N2 \ (V_{out} + V_{DO})$.

If a voltage divider of ratio $N2/N1$ is placed across the primary, it will deliver a voltage $V_s = V_{out} + V_{DO}$ at time $t_1$. A voltage $V_{DO}$ can be subtracted from this using the forward drop of a small silicon diode, leaving a voltage $V_s = V_{out}$.

Using a sample-and-hold circuit, a voltage sample $V_{ss}$ can be generated and used to control the blocking oscillator to hold $V_{ss}$, and therefore $V_{out}$, constant.

Figure 1:
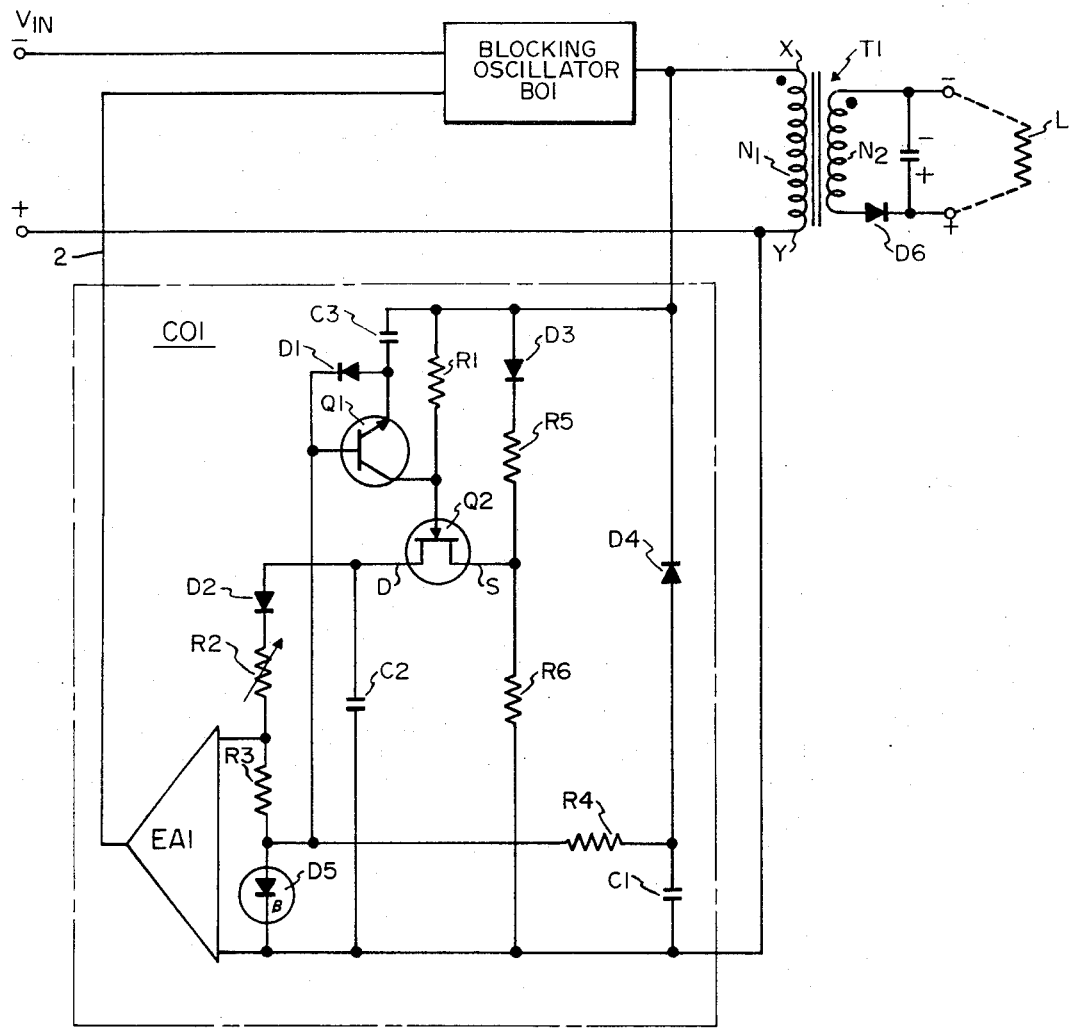
FIG. 1 is a schematic circuit diagram of a converter including a voltage sampling system according to this invention.

A circuit according to this concept is shown in FIG. 1. A gating signal for the field effect transistor Q2 sample-and-hold circuit is derived via the network consisting of resistor R1, capacitor C3 and transistor Q1. This shuts transistor Q2 off at $t_1$ when the waveform starts to go negative.

Capacitor C2 forms a lag network with the divider network, so that the voltage stored on capacitor C2 is a model of the voltage time $t_1$. A more accurate model could be generated if necessary by using a delay line between the voltage divider and the sample-and-hold circuit.

Detail. Referring to the drawing there is shown a DC to DC converter as typically used in electronic telephone exchange power supplies, consisting of the direct current chopping or blocking oscillator B01 connected in the primary circuit of the step down transformer T1, with the control circuit C01 control output 2 connected to the blocking oscillator and the voltage sensing leads connected across the transformer T1 primary winding N1. The secondary winding N2 of transformer T1 is shown with a rectifier D6 in the series path with the load L. A filter capacitor C4 is shown across the output leads + and $-V_{out}$.

The control circuit C01 input is from the terminals X and Y across the primary winding N1 of transformer T1. At the time the switch is turned on in the blocking oscillator B01 the terminal X is negative. The voltage divider resistors R5 and R6 connected across these input conductors do not conduct during the interval that the magnetic field in the transformer T1 builds up due to the direction the diode D3, in series with these resistors, is poled. However, a diode D4, serving as a bias supply rectifier is connected in series with capacitor C1 across the terminals X and Y, does conduct to charge the capacitor. A current limiting resistor R4 in series with a voltage regulating diode D5 is placed across the capacitor C1. The negative reference potential at the anode of diode D5 is connected to the base of transistor Q1 to provide it with a constant bias.

As the current flow reverses in the primary winding N1 diode D4 ceases conduction, and the charge on capacitor C1 is maintained. At this time diode D3 conducts to pass a current through the voltage divider resistors R5 and R6. The values of these resistors are selected such that the voltage across resistor R6 is representative of the voltage across the secondary N2 of the transformer T1, when the resistance of resistors R5 and R6 is representative of the primary winding voltage ($R6/R5+R6 = N2/N1$).

At the time the flow through the primary winding N1 reaches a point in time as shown by the point $t_1$ on the waveform chart FIG. 2 the voltage across resistor R6 is gated through. This gating operation is performed by the field effect transistor Q2 which has its source electrode connected to the junction of resistors R5 and R6, and its drain electrode via diode D2 and variable resistor R2 to the input of an error amplifier EA1.

Diode D2 is used to compensate for the voltage drop of diode D6 in the output, and variable resistor R2 is used to adjust the output voltage to the error amplifier. The delay network, for providing the lag to the error amplifier, of the sensed voltage V5 is comprised of a capacitor C2 in this embodiment. The voltage sample $V_{ss}$ is that stored on the upper plate of capacitor C2. It is connected from the junction of the drain electrode of transistor Q2 and the anode of diode D2 to the Y conductor. Capacitor C2 is shunted by the series path consisting of diode D2, variable resistor R2, resistor R3, diode D5. The return path for the input of the error amplifier EA1 is to the conductor of terminal Y, while the output amplified to the proper operating level is connected to the input of the blocking oscillator.

Transistor Q1 and its associated components function to assist transistor Q2 to turn on and off at the proper times in the cycle.

Transistor Q1 is connected with its collector connected to the control electrode of the field effect transistor Q2 and via a resistor R1 to the terminal X. The emitter of transistor Q1 is connected to capacitor C3, whose other plate is connected to terminal X. A diode D1 is shown across transistor Q1 with its cathode connected to the base and its anode to the emitter of transistor Q1 to protect it from inverse polarity surges. The collector of transistor Q1 is connected to the gate electrode of transistor Q2 and a terminal of resistor R1. The remaining terminal of resistor R1 is connected to the terminal X of transformer T1.

Positive potential via resistor R1 to the gate electrode of Q2 normally causes transistor Q2 to become conductive when terminal X becomes positive. To turn off transistor Q2 the circuit including transistor Q1 is added; as the voltage at terminal X starts to drop capacitor C3 is discharged via the emitter to collector path of transistor Q1 and resistor R1, thus bringing the junction of the gate electrode of transistor Q2 and resistor R1 to a negative potential much faster than would be the case with only resistor R1. In this way, C2 does not lose its charge through R6, and a sample of the output voltage at time $t_1$ is retained.

What is claimed is:

1. A voltage converter for connection between a source of direct current of a first potential and a load requiring a direct current of a second potential, comprising: an oscillator connected to said source and operated to produce an alternating current output, said oscillator having a control input operative to control said output; a transformer connected between said oscillator and said load including a primary winding connected to said oscillator output and a secondary winding connected to said load; rectification means, connected between said transformer and said load, operative to convert said alternating current potential to direct current potential and to apply it to said load; and a control circuit including a first and a second resistor and a diode in series connected across said transformer primary winding; a gating means including: a field effect transistor having a source, a drain and a gate electrode, said source electrode connected to the junction of said first and second resistors, a third resistor, said gate electrode connected to one side of said transformer primary winding via said third resistor, said drain electrode connected to said oscillator control input, said field effect transistor conditioned in response to a selected portion of each cycle of said oscillator output to pass the potential level at said junction of said first and second resistors to said oscillator control input, whereby said oscillator is controlled to vary its operation in response to the load conditions sensed by said control circuit.

2. A voltage convertor as claimed in claim 1 wherein said control circuit further includes an amplifier connected between said drain electrode and said oscillator control input.

3. A voltage converter as claimed in claim 1 wherein said control circuit further includes a transistor having a base, an emitter and a collector, said collector connected to said gate electrode, a capacitor, said emitter connected to said one side of said transformer primary winding via said capacitor, a voltage bias means, said base operatively connected to said voltage bias means, said transistor operated in response to a selected portion of each cycle to accelerate the turn off of said field effect transistor.

4. A voltage converter as claimed in claim 1 wherein said control circuit further includes a diode in series with said connection to said oscillator input to compensate for said rectification means voltage drop.

5. An inverter for connection between a source of direct current potential and a load comprising: an oscillator connected to said source and operated to produce an alternating current output, said oscillator having a control input operative to control said output; a transformer connected between said oscillator and said load including a primary winding connected to said oscillator output and a secondary winding connected to said load; and a control circuit including a first and a second resistor and a diode in series connected across said transformer primary winding; a gating means including; a field effect transistor having a source, a drain and a gate electrode, said source electrode connected to the junction of said first and second resistors, a third resistor, said gate electrode connected to one side of said transformer primary winding via said third resistor, said drain electrode connected to said oscillator control input, said field effect transistor conditioned in response to a selected portion of each cycle of said oscillator output to pass the potential level at said junction of said first and second resistors to said oscillator control input, whereby said oscillator is controlled to vary its operation in response to the load conditions sensed by said control circuit.

6. An inverter as claimed in claim 5 wherein said control circuit further includes an amplifier connected between said drain electrode and said oscillator control input.

* * * * *